United States Patent [19]

Bougher

[11] Patent Number: 4,832,410

[45] Date of Patent: May 23, 1989

[54] SEAT BELT BUCKLE ASSEMBLY

[75] Inventor: Jerry D. Bougher, Lebanon, Ind.

[73] Assignee: Indiana Mills & Manufacturing, Inc., Westfield, Ind.

[21] Appl. No.: 111,182

[22] Filed: Oct. 22, 1987

[51] Int. Cl.⁴ ............................................. A62B 35/00
[52] U.S. Cl. .................................................. 297/474
[58] Field of Search ....................... 297/468, 474, 480; 280/801

[56] References Cited

U.S. PATENT DOCUMENTS

| | | | |
|---|---|---|---|
| 3,107,121 | 10/1963 | Mougey | 297/474 |
| 3,318,634 | 5/1967 | Nicholas | 297/474 |
| 3,551,002 | 12/1970 | Dozois | 297/474 |
| 3,583,763 | 6/1971 | Settimi | 297/474 |
| 3,584,896 | 6/1971 | Jantzen | 297/474 |
| 3,606,456 | 9/1971 | Cazabon | 297/474 |
| 4,201,418 | 5/1980 | Reidelbach | 297/474 |
| 4,506,912 | 3/1985 | Ahad | 297/474 X |
| 4,611,854 | 9/1986 | Pfeiffer | 280/801 X |

Primary Examiner—Peter A. Aschenbrenner
Attorney, Agent, or Firm—Woodard, Emhardt, Naughton, Moriarty & McNett

[57] ABSTRACT

A seat buckle assembly including a buckle and a mounting bracket, a pair of sliding members coupled with one another, and a webbed belt looped through the members and connecting the buckle with the bracket, the sliding members having a first position in which the buckle is in a relatively retracted position and a second position in which the buckle is in a relatively extended position, the assembly including a pair of springs urging the members to the first, retracted position, the application of an external pulling force on the buckle moving the connecting members and buckle against the spring force and into the second, relatively extended position, the connecting members and buckle returning to the first, retracted position upon release of the external force.

15 Claims, 4 Drawing Sheets

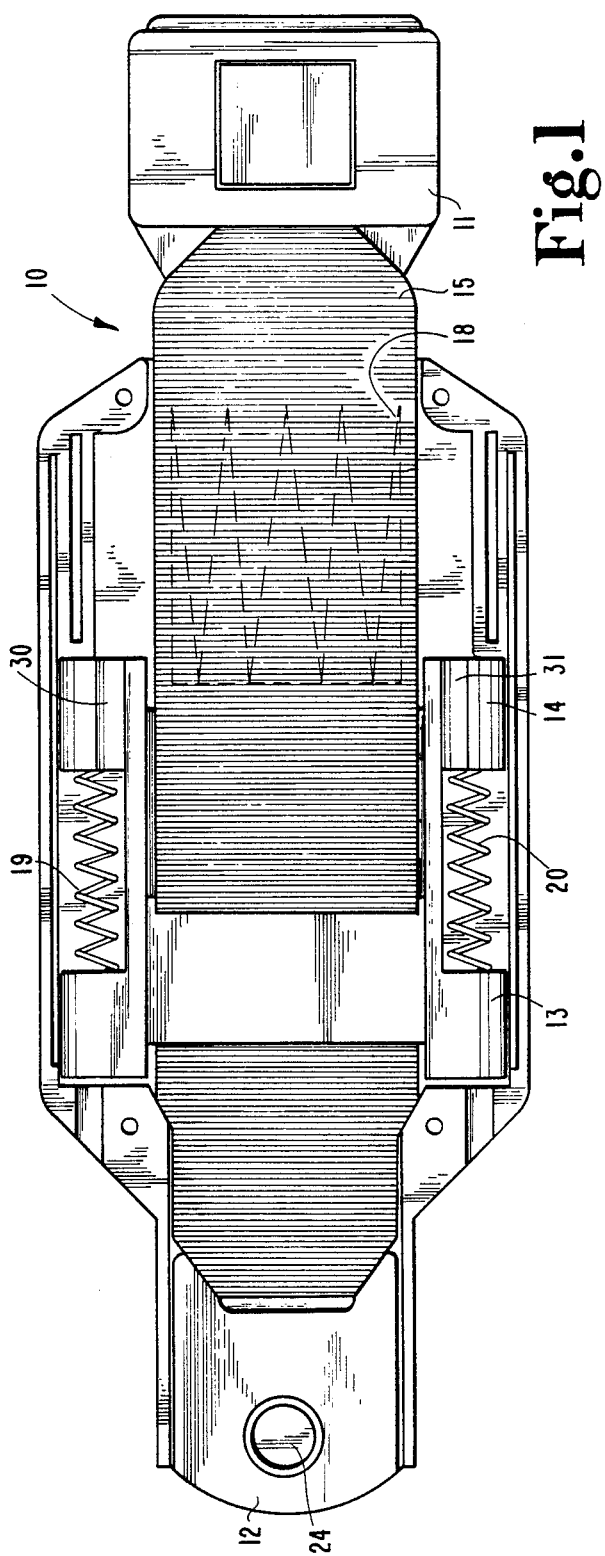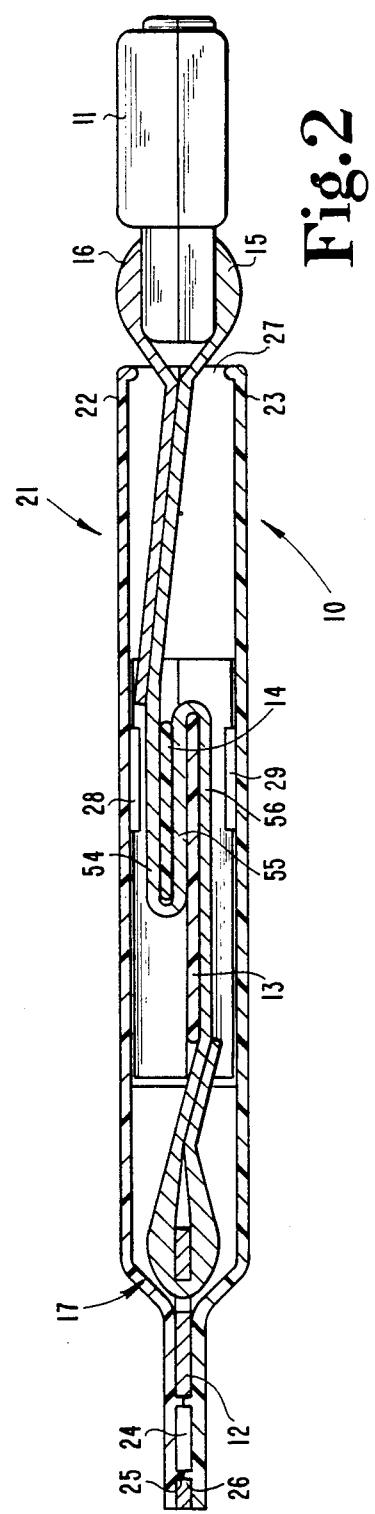

SEAT BELT BUCKLE ASSEMBLY

BACKGROUND OF THE INVENTION

1. Field of the Invention

This invention relates to the field of seat belt buckles, and particularly to a buckle assembly useful in a system including an automatic locking belt retractor.

2. Description of the Prior Art

Seat and shoulder belt systems, such as typically employed in passenger vehicles, include an automatic retractor device for collecting excess belting and providing tensioning for the system. The system may include, for example, a spring-biased spool for urging the webbed belt around the spool and thus into the retractor. Once the seat belt and shoulder harness are secured by buckling, the excess belt is retracted.

In systems including an automatic locking retractor, the belt will pay out of the retractor only after the belt has been fully retracted. One drawback of such systems is that the belt may therefore cinch down on the occupant, and the tightened condition cannot be relieved without removing the belt and retracting it fully into the retractor. During a rough ride, the occupant may be pushed or bounced down in the seat, at which time the retractor recognizes the slack in the belt and takes it up. When the seat attempts to move to the original position, the retractor will not pay webbing out, and the occupant is restrained in the lower position.

The present invention overcomes the cinching problem by providing a mechanism to offset the tendency of the retractor to collect all of the slack in the belt. The buckle assembly of the present invention includes a means for collecting a portion of the extended belt in lieu of collection by the automatic locking retractor, and then will pay the belting back out to compensate for movement in the vehicle seat.

SUMMARY OF THE INVENTION

Briefly describing one aspect of the present invention, there is provided a seat belt buckle assembly which includes a mounting bracket and a belt buckle, and first and second members connectable with the bracket and the buckle, respectively, the connecting members being coupled with and movable relative one another corresponding with retraction or extension of the buckle relative the bracket, the assembly further including means for normally maintaining the buckle in the retracted position but permitting the buckle to be extended in response to an external force of predetermined amount, said means returning the buckle to the retracted position upon decrease of the external force.

It is an object of the present invention to provide a seat belt buckle assembly which is useful in conjunction with an automatic locking retractor assembly.

A further object of the present invention is to provide an assembly which overcomes the tendency of an automatic locking retractor system to cinch down upon a user.

It is another object of the present invention to provide an assembly which is compact in design and has a long life expectancy.

Another object of the present invention is to provide an assembly which parallels the seat belt system, thus not impairing operation or use of the system and not requiring high strength to operate.

Further objects and advantages of the present invention will become apparent from the description of the preferred embodiment which follows.

BRIEF DESCRIPTION OF THE DRAWINGS

FIG. 1 is a top, plan view of the buckle assembly of the present invention, showing the top of the cover removed.

FIG. 2 is a side, cross-sectional view of the assembly of FIG. 1.

DESCRIPTION OF THE PREFERRED EMBODIMENT

Figure 3:
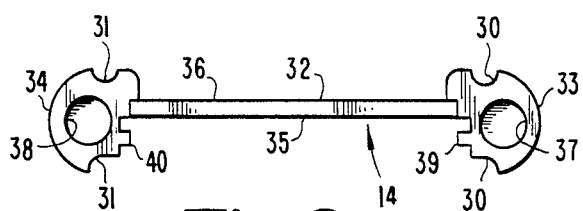
FIG. 3 is a first end view of a connecting member useful in accordance with the present invention.
Figure 4:
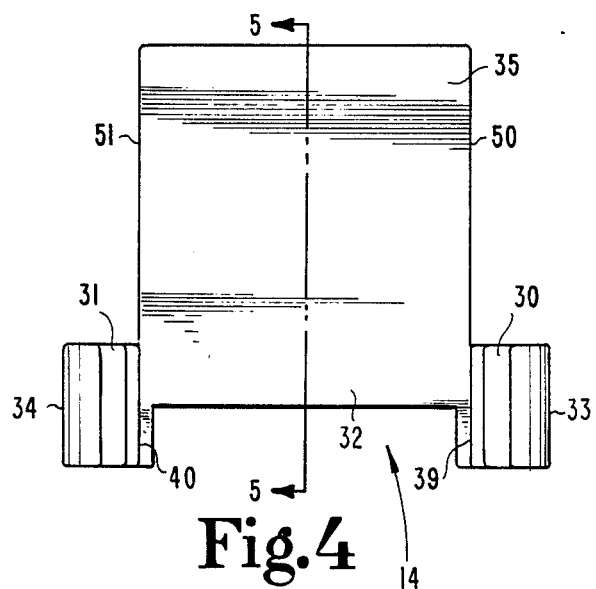
FIG. 4 is a top, plan view of the connecting member of FIG. 3.
Figure 5:
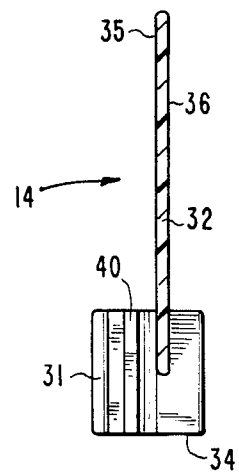
FIG. 5 is a side, cross-sectional view of the connecting member of FIG. 4, taken along the line 5-5 and looking in the direction of the arrows.
Figure 6:
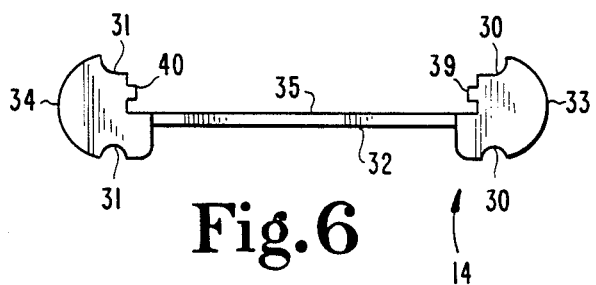
FIG. 6 is a second end view of the connecting member of FIG. 3.
Figure 7:
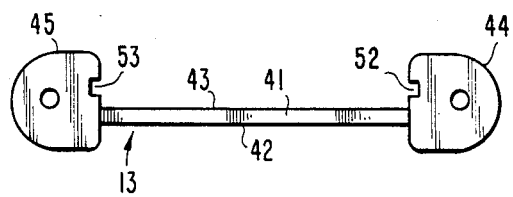
FIG. 7 is a first end view of a second connecting member useful in accordance with the present invention.
Figure 8:
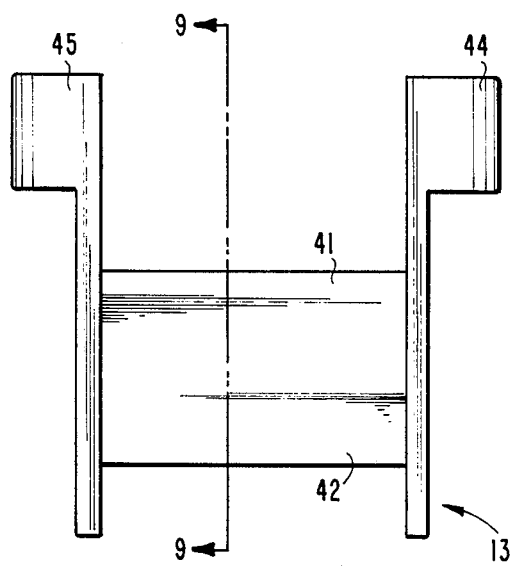
FIG. 8 is a top, plan view of the second connecting member of FIG. 7.
Figure 9:
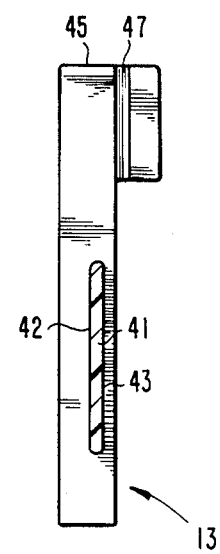
FIG. 9 is a side, cross-sectional view of the second connecting member of FIG. 8, taken along the line 9—9 and looking in the direction of the arrows.
Figure 10:
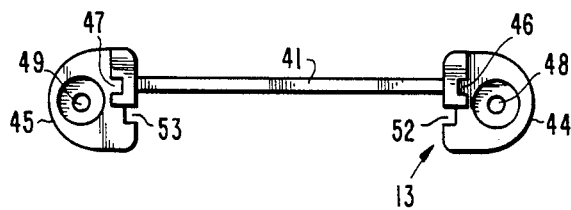
FIG. 10 is a second end view of the second connecting member of FIG. 7.

For the purposes of promoting an understanding of the principles of the invention, reference will now be made to the embodiment illustrated in the drawings and specific language will be used to described the same. It will nevertheless be understand that no limitation of the scope of the invention is thereby intended, such alterations and further modifications in the illustrated device, and such further applications of the principles of the invention as illustrated therein being contemplated as would normally occur to one skilled in the art to which the invention relates.

In certain seat belt systems, an automatic locking retractor is employed. This retractor operates so that the excess length of belt is collected and the belt is then locked in this position, In such devices, however, it is possible that the retractor may withdraw an excess amount of the belt, thus holding the user in a more restricted position than desired.

For example, certain vehicles employ seats which have a significant amount of movement, such as vertical motion resulting from passage of the vehicle over a rough surface. It is possible in these conditions for an automatic locking retractor to "cinch down" the lap belt on the occupant, since an additional length of belt may be withdrawn and locked when the seta moves downwardly relative the vehicle. The present invention provides a mechanism useful, for example, in systems having an automatic locking retractor, in order to avoid the "cinching down" of the lap belt.

Referring particularly to the drawings, there is shown a seat belt buckle assembly 10 constructed in accordance with the present invention. As shown in FIGS. 1 and 2, the assembly 10 includes a seat belt buckle 11 connected with a mounting bracket 12. The buckle 11 may be of any conventional design such as typically used with seat belts. The bracket 12 similarly may be provided in any desired configuration suitable for mounting the assembly to a vehicle in a desired manner. As will be described hereafter, means are provided for connecting the buckle 11 to the bracket 12 through a pair of connecting members 13 and 14. The buckle and bracket are preferably connected by means of a flexible webbing 15 having a first end 16 secured to the buckle 11 and a second end 17 secured to the bracket 12, both as by looping through apertures and stitching, as shown at 18, to the adjacent webbing material.

The first connecting member 13 is coupled with the second connecting member and movable relative thereto. Preferably, the first member 13 is slidable with respect to the second member 14 as it is described hereafter with respect to subsequent figures. A pair of compression springs 19 and 20 urge the connecting members into a first position which holds the buckle 11 in a relatively retracted position. The connecting members are movable relative one another, against the resistance of the springs 19 and 20, to move the buckle into a second, relatively extended position.

As shown in FIG. 2, the connecting members and substantial portions of the webbing 15 are contained within a cover 21, including top and bottom halves 22 and 23, respectively. The bracket 12 includes a mounting hole 24 which is secured about annular projections 25 and 26. At the opposite end of the cover, there is defined an opening 27 through which the buckle 11 and webbing 16 are extendable. Each of the cover halves on both sides of the cover define raised rails, such as 28 and 29, which are received in grooves such as 30 and 31 in the adjacent connecting members, helping to stabilize the member 14 in position within the cover.

Referring in particular to FIGS. 3-6, there is shown in detail the configuration of the connecting member 14. Member 14 includes a center portion 32 and a pair of outer portions 33 and 34. The center portion is an extended, planar shape having an inner surface 35 and an outer surface 36. The outer portions define grooves 30 and 31, and include recesses 37 and 38 for reception of first ends of the springs 19 and 20. The outer portions 33 and 34 further define a pair of oppositely-facing tongues 39 and 40 which are slidably received within respective grooves defined by the other connecting member 13.

Referring now in particular to FIGS. 7-10, there is shown the detailed configuration of the connecting member 13. Member 13 includes a center portion 41 which is a planar, rectangular member having an inner surface 42 and an outer surface 43. Member 13 also includes a pair of outer portions 44 and 45 defining oppositely-facing grooves 46 and 47 within which are received the tongues 39 and 40, respectively. Recesses 48 and 49 are also provided in the outer portions 44 and 45 for reception of a second end of each of the springs 19 and 20. In addition, outer edges 50 and 51 of the center portion 32 of connecting member 14 are received within the inwardly facing grooves 52 and 53 of connecting member 13.

Figure 11:
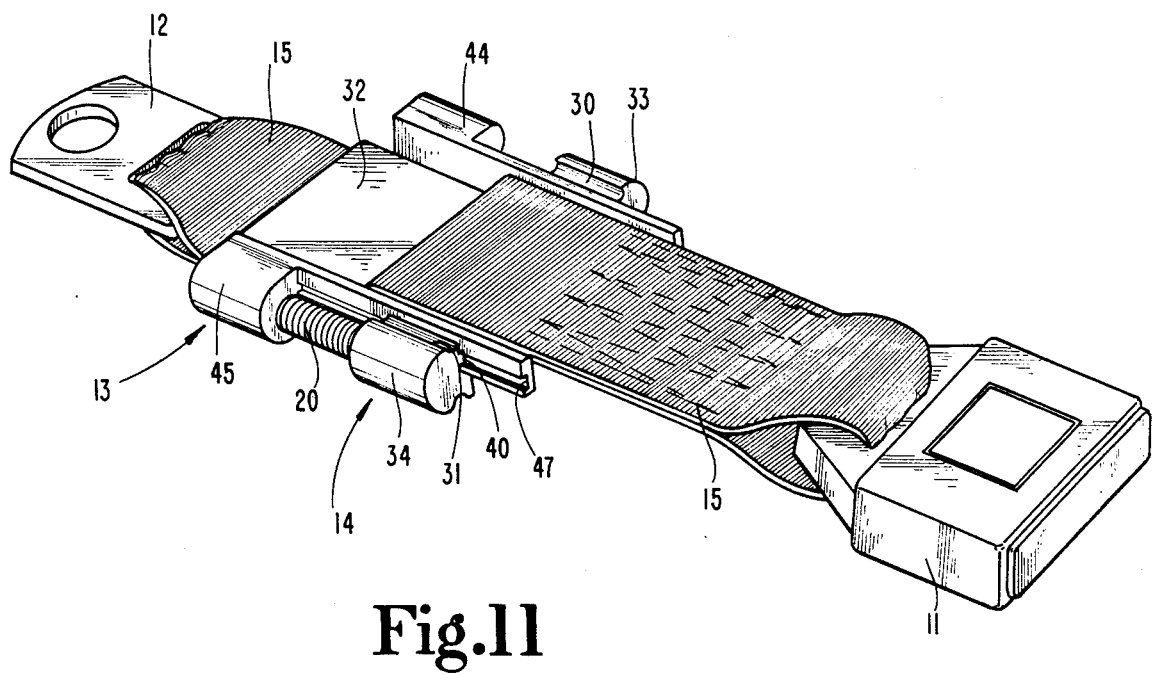
FIG. 11 is a perspective view of the assembly of FIG. 1 showing the cover fully removed and the buckle in the extended position relative the connecting members.

As shown for example in FIGS. 2 and 11, the connecting members 13 and 14 are movable relative one another between first and second positions. The connecting members are coupled with one another to provide relative movement, preferably sliding movement. In FIG. 1 the sliding members 13 and 14 are shown with the springs 19 and 20 in the relaxed condition and the buckle is in the relatively retracted position. When external force is applied to pull the buckle outwardly of the assembly, the members slide against the resistance afforded by compression springs 19 and 20 to the position as shown, for example, in FIG. 11. The buckle is then moved into a relatively extended position relative the assembly. Upon relaxation of the external force, the springs urge the members 13 and 14 apart, and the buckle is returned to the retracted position as shown in FIG. 1.

The operation of assembly 10 in combination with an automatic locking retractor system is as follows. When the lap belt arrangement is engaged with the buckle 11, the belt will retract to rest against the user. In this condition, the retractor will not pay out any belting, and the user is restrained in position against the seat. If the seat moves downwardly, as may occur when traveling over a rough surface, then the retractor will sense the presence of slack in the belt, and it will collect additional length of belt. In the absence of the present invention, the user would be restricted by this action, and would be held more firmly than desired in the seat, or the seat may in fact be held down in a constrained position. Further downward movement of the seat would result in additional cinching down of the user and seat. However, the present assembly avoids this occurrence.

When the seat moves downward, the additional length of belt is retracted by the automatic locking retractor. However, when the seat moves back up to its original position, the assembly 10 allows the buckle to move outwardly, paying out a portion of the belting 15. The force of the seat moving upward, as caused perhaps by the spring support for the seat, applies an external force causing the members 13 and 14 to move relative one another, moving the buckle to the extended position of FIG. 1. The seat is thus positioned in the starting position with the lap belt held against the user and tensioned by the springs 19 and 20 urging the members together and the belting 15 back to the relatively retracted position.

When the seat and user again move downward, such as in reaction to a rough ride, the assembly 10, rather than the automatic locking retractor, collects the slack belt. To assure this, the retracting force applied by the springs 19 and 20 is predetermined to exceed that of the automatic locking retractor. Thus, the slackened belt is preferentially collected by the assembly. Then when the seat and user again move upwardly to the original position, the assembly pays out belt 15 to accommodate such movement. The assembly 10 thereby avoids the cinching down of the lap belt against the user and seat.

Various means may be provided for permitting the buckle 11 to move between the extended and retracted positions. In the preferred embodiment shown in the drawings, the movement means comprises the sliding members 13 and 14 in cooperation with springs 19 and 20 and belt 15. As shown particularly in FIG. 2, the belt 15 includes portions wrapped over surfaces of the members 13 and 14. Specifically, belt 15 includes a first portion 54 attached with buckle 11 and extending over the outer surface of center portion 32 of connecting member 14. A second belt portion 55 extends between the inner surfaces of center portions 32 and 41 of members 14 and 13, respectively. Finally, a third portion 56 extends adjacent the outer surface of center portion 41 and connects with bracket 12. By this arrangement, pulling force applied outwardly on buckle 11 through belt 15 will move the sliding members 13 and 14 away from each other, against the force of springs 19 and 20. Relaxation of the external force will permit the springs 19 and 20 to move the members back to the original position of FIG. 1.

The present invention provides an assembly which is readily employed in combination with lap belt systems, and is particularly advantageous in use with a system having an automatic locking retractor. The described unit provides a compact, durable design which parallels the belt system and does not impair its operation. The protective cover and design features such as use of compression springs assures a high fatigue life.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A seat belt buckle assembly which comprises:
a mounting bracket;
a first belt connector lockable with a second belt connector to form a tongue-buckle combination;
a first connecting member connectable with said bracket;
first connecting means for connecting said first connecting member with said bracket;
a second connecting member connectable with said first belt connector;
second connecting means for connecting said second connecting member with said first belt connector;
said first connecting member being coupled with said second connecting member and being movable relative said second connecting member between first and second positions, said first belt connector being retracted relative said bracket in the first position, said first belt connector being extended relative said bracket in the second position; and,
means for normally maintaining said first belt connector and said bracket in the first position and for exerting a predetermined force to retain said first and second members in the first position, said maintaining means also being for permitting said first belt connector and said bracket to move under resistance from the first position to the second position in response to an external force exceeding the predetermined force, said maintaining means also being for returning said first belt connector and said bracket from the second position to the first position upon decrease of the external force below the predetermined force, said maintaining means comprising at least one biasing member connected between said first and second connecting members and exerting a predetermined force urging said first and second connecting members in the first position.

2. The assembly of claim 1 and further including a cover enclosing said first and second connecting members.

3. The assembly of claim 1 in which said maintaining means comprises a pair of compression springs connected between said first and second connecting members and exerting a predetermined force urging said first and second connecting members in the first position.

4. The assembly of claim 1 in which said first and second connecting means comprises flexible webbing.

5. The assembly of claim 1 in which said first connecting member is slidably relative said second connecting member.

6. The assembly of claim 5 in which one of said first and second connecting members defines a groove and the other of said connecting members defines a tongue slidably received within the groove.

7. The assembly of claim 6 in which the one of said first and second connecting members defines a pair of grooves and the other of said connecting members defines a pair of tongues slidably received within respective ones of said grooves.

8. The assembly of claim 7 in which said maintaining means comprises a pair of compression springs connected between said first and second connecting members and exerting a predetermined force urging said first and second connecting members in the first position.

9. The assembly of claim 1 in which one of said first and second connecting members includes a center portion and two outer portions, the two outer portions defining a pair of oppositely-facing grooves, the other of said connecting members including a center portion and two outer portions, the outer portions of the said other connecting member defining a pair of oppositely-facing tongues slidably received within respective grooves of said one connecting member.

10. The assembly of claim 9 in which said first connecting member is slidable relative said second connecting member.

11. The assembly of claim 9 in which said first and second connecting means comprises flexible webbing.

12. The assembly of claim 9 in which said maintaining means comprises a compression spring connected between said first and second connecting members and exerting a predetermined force urging said first and second connecting members in the first position.

13. The assembly of claim 9 and further including a cover enclosing said first and second connecting members.

14. The assembly of claim 9 in which said maintaining means is for exerting force between the two pairs of outer portions of said first and second connecting members.

15. The assembly of claim 14 in which the center portions of said first and second connecting members lie one over the other and define inner and outer surfaces, said connecting means comprises flexible webbing having a first end and a second end, said flexible webbing from the first end to the second end extending consecutively adjacent the outer surface of one center portion in a first direction, back in the other direction between the inner surfaces of the two center portions, and back again in the first direction adjacent the outer surface of the other center portion, said first and second connecting means comprising means for connecting one end of said webbing to said bracket and the other end of said webbing to said first belt connector, respectively.

* * * * *

UNITED STATES PATENT AND TRADEMARK OFFICE
CERTIFICATE OF CORRECTION

PATENT NO. : 4,832,410

DATED : May 23, 1989

INVENTOR(S) : Jerry D. Bougher

It is certified that error appears in the above-identified patent and that said Letters Patent is hereby corrected as shown below:

In column 6, line 7, change the word "slidably" to --slidable--.

Signed and Sealed this

Thirtieth Day of January, 1990

Attest:

JEFFREY M. SAMUELS

Attesting Officer — Acting Commissioner of Patents and Trademarks

UNITED STATES PATENT AND TRADEMARK OFFICE
CERTIFICATE OF CORRECTION

PATENT NO.  : 4,832,410
DATED       : May 23, 1989
INVENTOR(S) : Jerry D. Bougher It is certified that error appears in the above-identified patent and that said Letters Patent is hereby corrected as shown below:

In the drawings on sheet 4, FIG. 11 should show a slot in the extreme right portion of the drawing as follows:

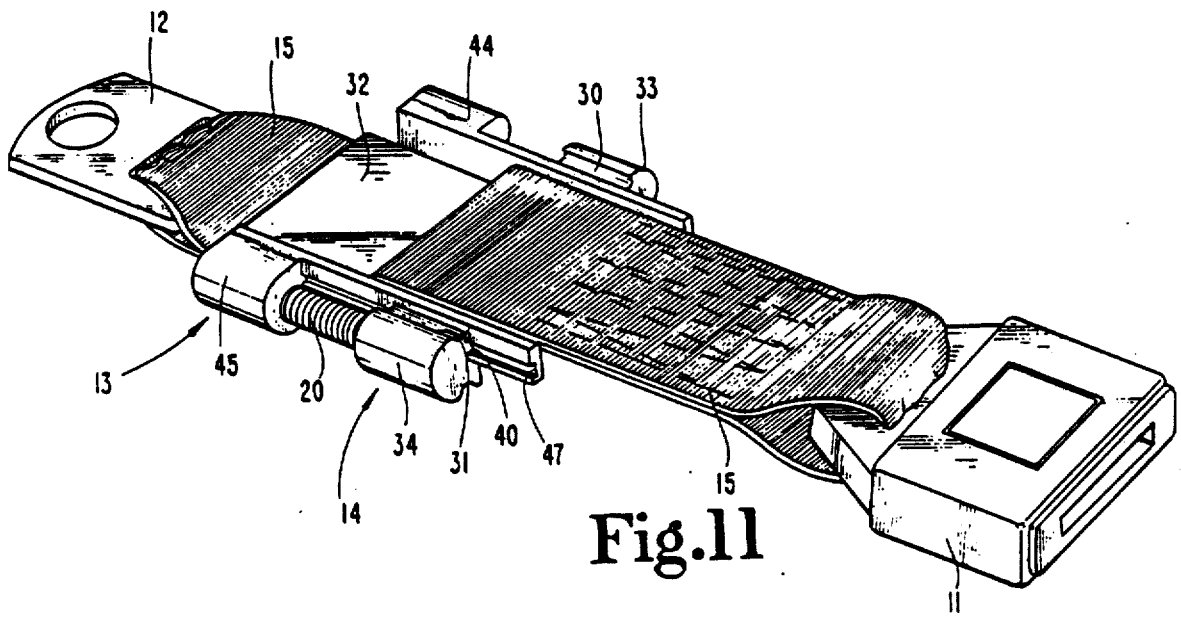

Signed and Sealed this

Sixth Day of March, 1990

Attest:

JEFFREY M. SAMUELS

*Attesting Officer*     Acting Commissioner of Patents and Trademarks